April 12, 1932. J. KUPKA 1,854,044
VALVE BOX FOR STEAM OR LIKE ENGINES
Filed June 18, 1925  3 Sheets-Sheet 1

INVENTOR
Johann Kupka
BY
ATTORNEY

April 12, 1932.  J. KUPKA  1,854,044
VALVE BOX FOR STEAM OR LIKE ENGINES
Filed June 18, 1925   3 Sheets-Sheet 2

INVENTOR
Johann Kupka
BY
ATTORNEY

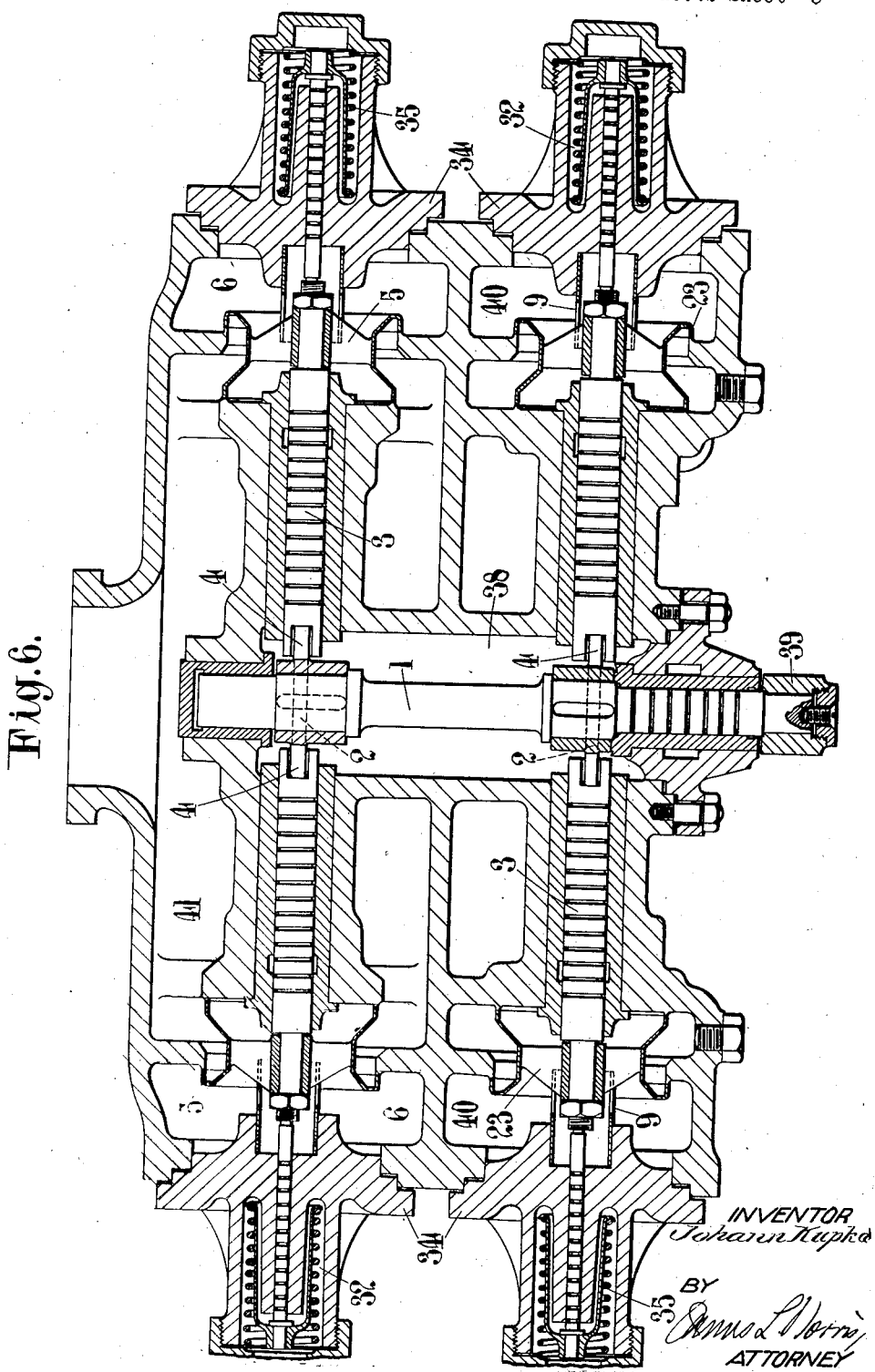

Patented Apr. 12, 1932

1,854,044

UNITED STATES PATENT OFFICE

JOHANN KUPKA, OF VIENNA, AUSTRIA

VALVE BOX FOR STEAM OR LIKE ENGINES

Application filed June 18, 1925, Serial No. 38,062, and in Great Britain April 29, 1925.

This invention relates to improvements in valve gear for steam or like engines, of the cam operated differential type. In the ordinary operation of such valves to control the flow of steam or other fluid under pressure, this fluid acts on the valves so that the ends of the valve stems, or rollers carried on these stems, are held in contact with the cams by the pressure of the fluid, or by the rush of the fluid if the valve opens slightly. When such valves are applied, for example, to locomotives, in the event of steam being cut off whilst the locomotive continues to travel, for instance, by inertia or along a down grade, the valves may remain lifted and the valve stems or the rollers therein will then be out of contact with the cams. It is however, in some cases, desirable that the valve stems or the rollers thereon should at all times be held in contact with the cams and for this purpose it has been proposed to provide springs arranged around the valve stems and acting to urge the valves towards their seats. These springs in the constructions heretofore proposed are situated within the valve box in spaces to which the fluid under pressure has access so that, in the case of steam engines, the springs are subjected to a high temperature, or to alternations of high and low temperatures.

According to this invention an improved arrangement of the valve stems is provided wherein the springs are arranged outside the valve box and can therefore be air cooled, the temperature to which they are subjected not rising above the temperature of the exterior of the valve box. For this purpose the valve stems are extended through the walls of the valve box or through cover plates set therein, and cages or caps are provided to enclose and protect the spring, these cages or caps also supporting suitable devices serving as abutments for the springs and as means whereby the springs can be placed under the required initial stress.

In the accompanying drawings—

Figure 6 is a plan view, in section of an entire valve box as shown in Figure 4.

Figure 1:
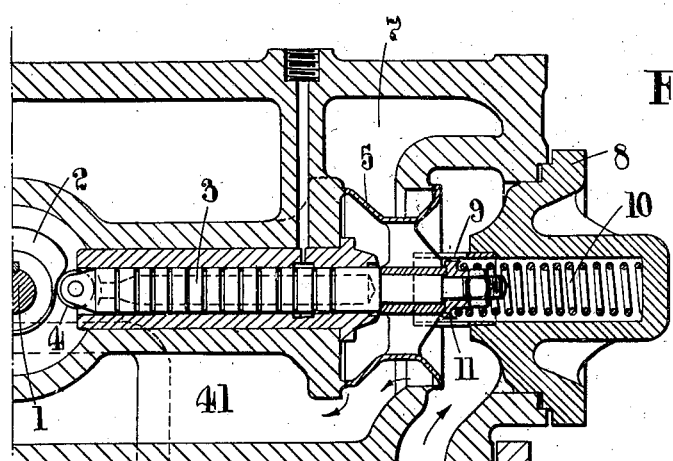
Figure 1 is a longitudinal section through one end of a valve box provided with a spring pressed valve.
Figure 5:
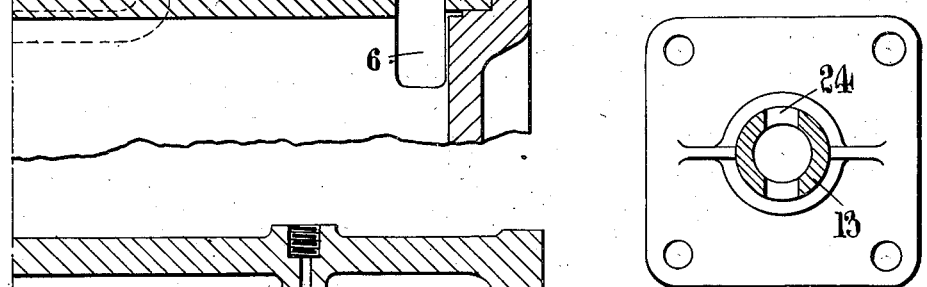
Figure 5 shows a section on the line 5—5, of Figure 2.

The arrangement shown in Figure 1 is that usually provided in valve boxes of the kind to which this invention relates and comprises a cam shaft 1 carrying a cam 2 acting on one end of the valve spindle 3, provided with an anti-friction roller 4. The differential valve 5 mounted on this spindle controls the passage from a cylinder port 6 to the exhaust conduit 7. Access is had to the valve 5 through an aperture in the wall of the valve box closed by a cover plate 8 carrying a valve guide 9 which is slotted to provide guideways for the webs of the valve and thus to prevent rotation of the valve about the longitudinal axis of the spindle. The cover plate 8 has a chamber 10 formed therein to enclose a spring held in compression between the end wall of the chamber and a bearing plate 11 on the spindle. In this arrangement the steam or other fluid flowing through the valve can enter the spring chamber 10 and come into direct contact with the spring.

Figure 2:
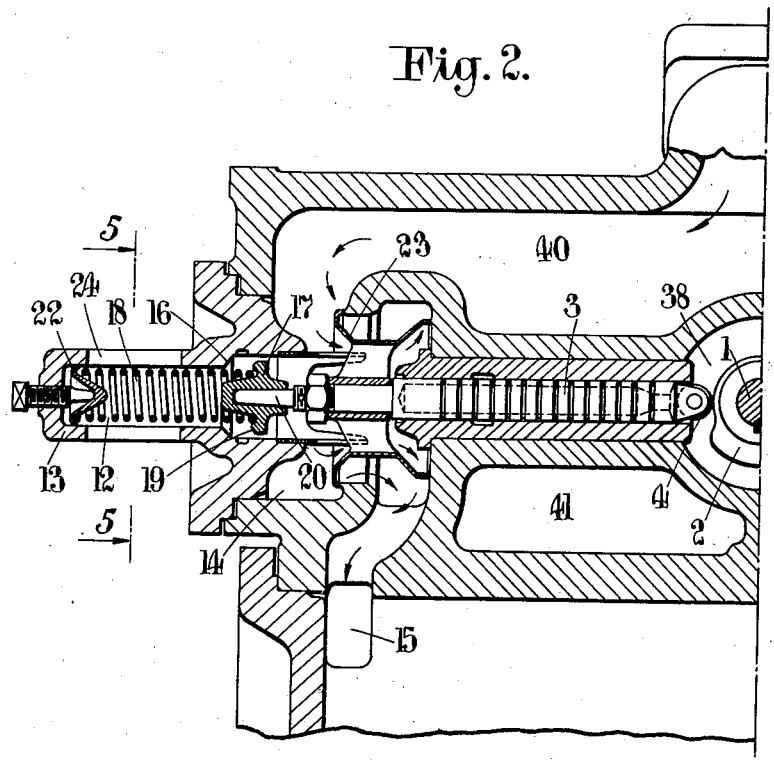

In Figure 2, a spring chamber 12 in the cover plate 13 closing the aperture in the wall of the valve box is open at one end to the passage 14 from which steam or other pressure fluid is admitted to the engine cylinder 15. At this end of the spring chamber a valve seat 16 is formed and a bearing plate 17 for the spring 18 has a valve surface 19 formed thereon to close on this seat. The bearing plate 17 is mounted loosely on the end 20 of the valve spindle to which it transmits the thrust of the spring 18 the other end of the spring being supported by an adjustable abutment 22. When steam is admitted to the passage 14, its pressure acts on the differential valve 23 and holds the valve spindle, or its roller, in contact with the valve operating cam. At the same time the pressure in this passage closes the valve 19 and compresses the spring 18. When the supply of pressure fluid to the passage 14 is cut off, the spring 18 comes into operation to urge the valve spindle towards the cam and to lift the valve 19 from the valve seat 16 so that air admitted through slots 24 in the wall of the spring chamber can enter the passage 14 and, if the differential valve 23 is opened by the cam, air can pass into the cylinder 15.

This arrangement is suitable for steam admission valves and provides a means for admitting air to the cylinder when the engine continues to run after steam has been cut off. It is to be noted that in this case the steam is not admitted to the spring chamber.

The distance of the valve seat 16 from the centre line of the cam shaft 1 and the distance of the valve surface 19 from the part of the roller 4 in contact with the cam 2, are chosen so that, taking into consideration the maximum radius of the cam, the valve 19 will not be closed by the cam and can only be closed by the steam pressure in the steam passage 14 acting against the spring 18.

Figure 3:
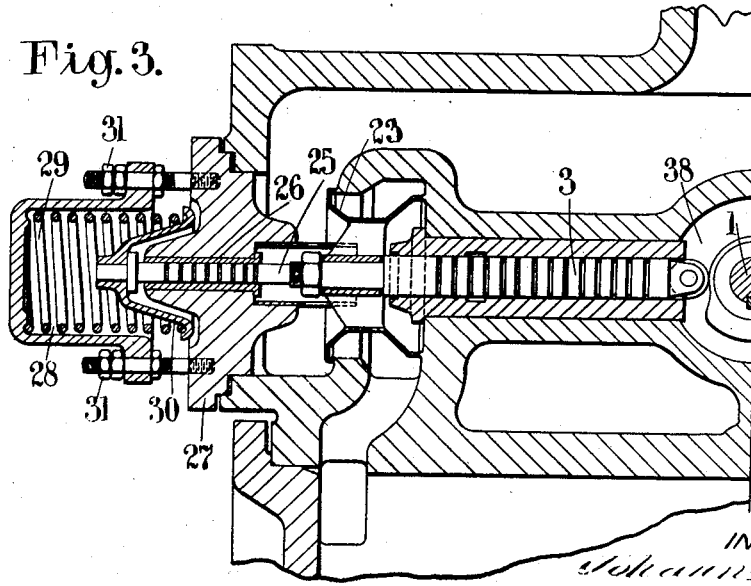

In a modified arrangement illustrated in Figure 3, the thrust of the spring is transmitted to the valve spindle by a spindle extension or spring plunger 25, separate from but abutting against the valve spindle, mounted in a packed guideway 26 in the cover plate 27. The spring chamber 28 is separate from the cover plate and the spring 29 is held between one end of this chamber and a stirrup 30 mounted on the spindle extension or plunger 25, the compression of the spring being adjustable by means of the studs and nuts 31 holding the spring chamber on the cover plate. In this arrangement the spring is entirely cut off from the steam passage.

Figure 4:
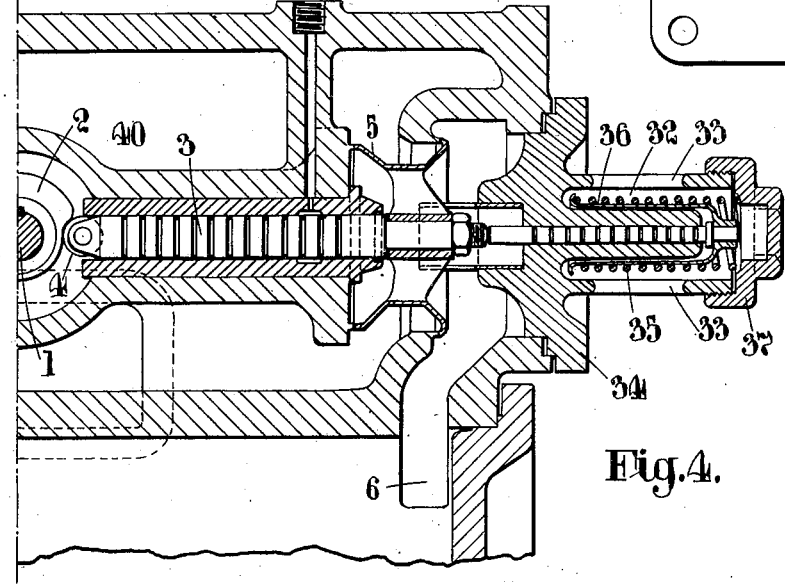
Figures 2, 3 and 4 are similar views to Figure 1 illustrating arrangements of spring pressed valves in accordance with this invention.

A similar arrangement is shown in Figure 4. In this case the spring chamber 32 with slots 33 in its walls is formed integrally with the cover plate 34, the stress of the spring 35 being exerted between a stirrup 36 on the spindle extension or plunger and an adjustable cap 37 on the spring chamber.

The arrangements shown by Figures 3 and 4 do not provide for admission of air to the passage within the cover plate and are suitable for either admission or exhaust valves.

In the arrangements shown in Figure 6 it is to be noted that the valves are arranged in pairs on opposite sides of the cam shaft with their spindles in alignment extending parallel to the cylinder axis with a steam admission valve and an exhaust valve for one end of the cylinder on one side of the cam shaft and corresponding valves for the other end of the cylinder on the other side of this shaft. This provides an arrangement which is symmetrical about axes which are respectively parallel and transverse to the cylinder axis.

Although as shown in Figures 1, 2, 3 and 4 different constructions of the means for supporting the valve springs can be provided, it is preferable that all the spring supporting means in one valve box should be of a like kind, as shown in Figure 6, and in practice the valves also themselves can be of like construction for convenience of manufacture.

The cam shaft 1 and the end of the valve spindles 3 are arranged within a tubular chamber 38 shut off from the steam and exhaust spaces of the valve box, the spindle extending out through a suitable guide or bearing and having at its outer end a crank or arm 39 by means of which a rotary or oscillatory movement may be imparted to this shaft. The ends of the chamber 38 and the bearing through which the shaft 1 passes can be made steam tight.

It will be noted that the cam chamber 38 is arranged between the live steam space 40 and the exhaust space 41 so that each of the spaces can extend from end to end of the valve box. Thus branching of the steam supply pipe is avoided.

I claim:

1. In a steam engine, a valve box, a valve stem, a valve on the valve stem and located in said valve box, a removable cover plate to said valve box, a spring chamber open to the atmosphere and arranged upon the exterior of said cover plate, a spring in said chamber for acting on said valve stem to close the valve, and means for permitting the supplying of air from the spring chamber to the valve box and for preventing the escape of steam from said valve box to the spring chamber.

2. In a steam engine, a valve box, a valve stem, a valve on the valve stem, a removable cover plate to said valve box, a spring chamber arranged on the exterior of the cover plate and having its interior in free communication with the atmosphere, a spring in said chamber for acting on the valve stem to close the valve, and means for allowing air to pass from the spring chamber to the valve box.

3. In a steam engine, a valve box, a valve stem, a thrust member separate from and arranged in alignment with the valve stem, a flange on said thrust member, a valve mounted on said valve stem, a removable cover plate to said valve box, a spring chamber open to the atmosphere and arranged upon the exterior of said cover plate, a spring in said chamber acting on the flange on said thrust member to move said valve stem and close the valve, and means for allowing air to pass from the spring chamber to the valve box.

4. In a steam engine, a valve box, a valve stem, a thrust member separate from and arranged in alignment with the valve stem, a flange on said thrust member, a valve mounted on said valve stem, webs forming part of said valve, a removable cover plate to said valve box, a spring chamber open to the atmosphere and arranged upon the exterior of said cover plate, a spring in said chamber acting on the flange on said thrust member to move said valve stem and close the valve, means for allowing air to pass from the spring chamber to the valve box, and a valve guide mounted in the cover plate and provided with slots in which the webs of the valve slide.

JOHANN KUPKA.